Oct. 27, 1953     C. F. RICHTER, SR     2,657,026
EVAPORATION TYPE VEHICLE CLEANING AND COOLING UNIT
Filed Jan. 5, 1951     2 Sheets-Sheet 1
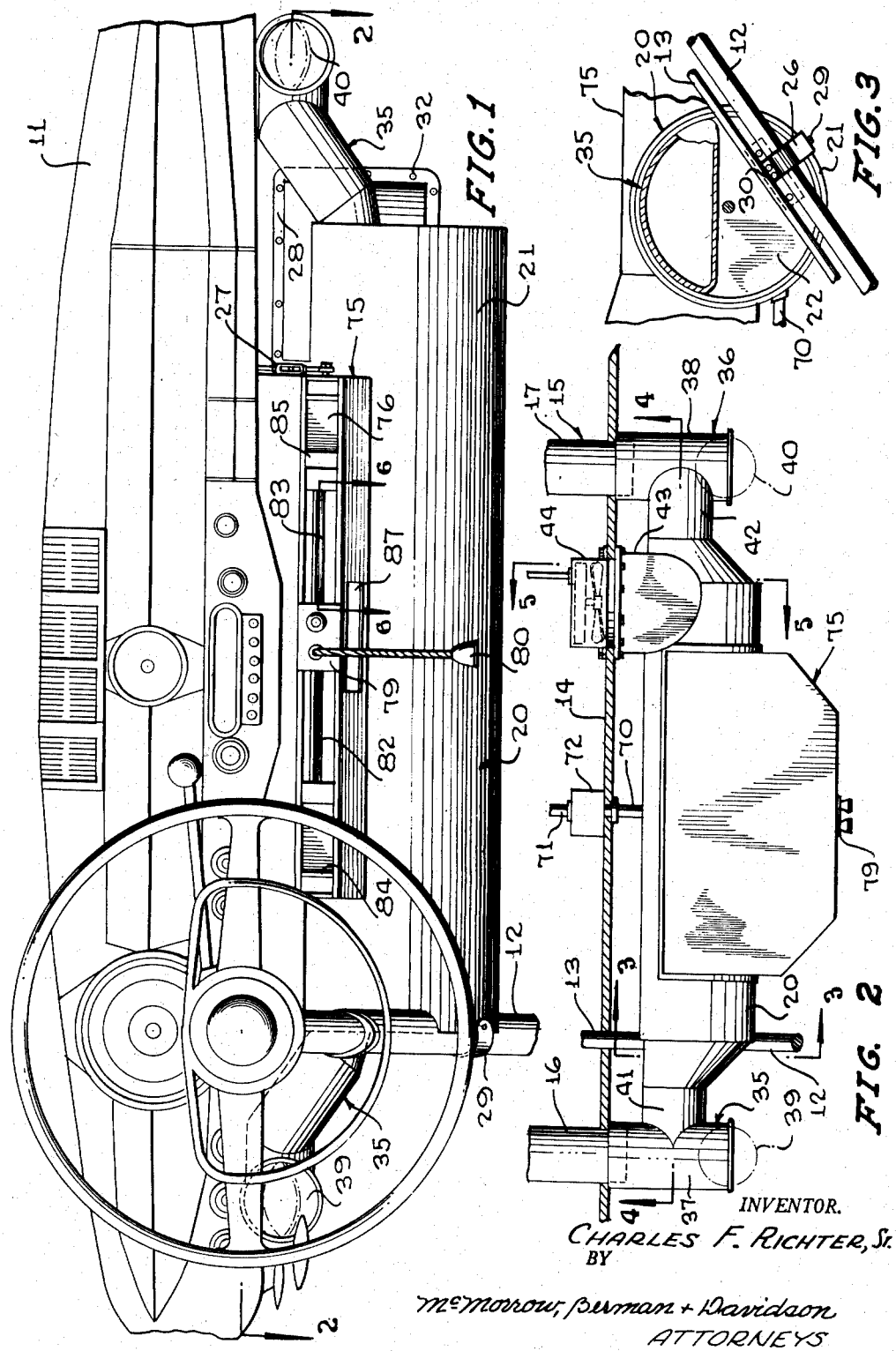
INVENTOR.
CHARLES F. RICHTER, SR.
BY
McMorrow, Berman + Davidson
ATTORNEYS

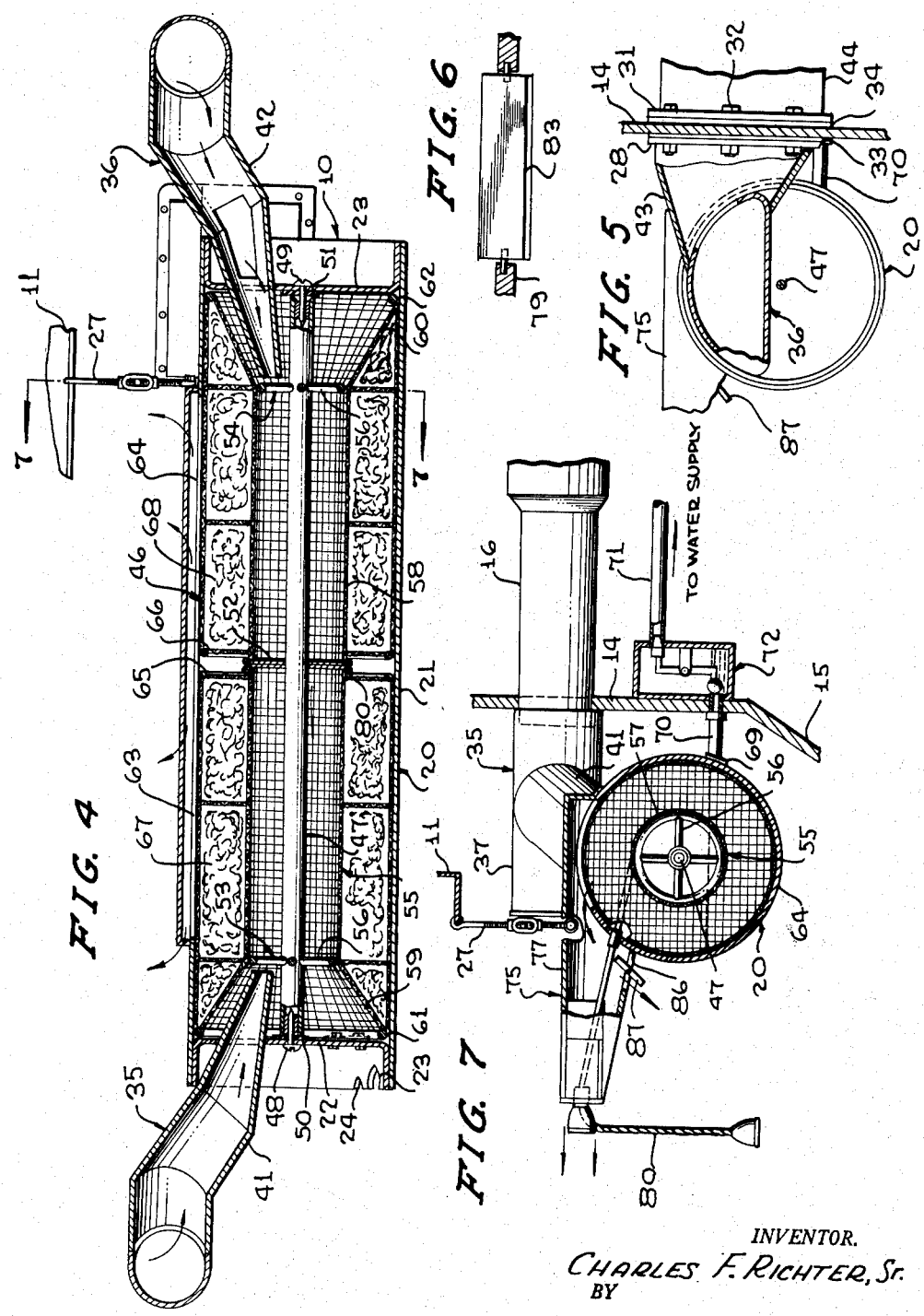

Patented Oct. 27, 1953

2,657,026

UNITED STATES PATENT OFFICE 2,657,026

EVAPORATION TYPE VEHICLE CLEANING AND COOLING UNIT

Charles Frederick Richter, Sr., Victoria, Tex.

Application January 5, 1951, Serial No. 204,657

3 Claims. (Cl. 261—92)

This invention relates to air conditioning apparatus, and more particularly to an improved evaporation-type air-cleaning and cooling unit for an automotive vehicle and adapted to be mounted within the body or passenger compartment of the vehicle.

An object of this invention is to provide an air-cleaning and cooling unit of the above indicated character which is particularly adapted to receive drafts of air from the outside air intake tubes of the vehicle, and circulate the air through a porous wet medium, whereby the air is cooled and cleaned due to evaporation of moisture prior to discharge into the interior of the vehicle.

Another object of this invention is to provide an evaporation-type cleaning and cooling unit of the above indicated character which permits the vehicle occupants to drive in comfort with the windows closed, thereby eliminating the discomforts of wind burn which occur when driving in extremely hot weather with the windows open and undesired noises which are created when driving at high speeds with the windows open.

A further object of this invention is to provide an evaporation-type air-cleaning and cooling unit which is particularly adapted for attachment interiorly of an automotive vehicle and is provided with control vanes, thereby permitting the cooled and cleaned air to be directed to all the vehicle occupants.

A still further object of this invention is to provide an evaporation-type air-cleaning and cooling unit which is particularly adapted to receive air to be cleaned and cooled from a pair of vehicle air intake tubes, thereby increasing the efficiency and cooling capacity of the unit.

A still further object of this invention is to provide an evaporation-type air-cleaning and cooling unit which is particularly adapted for attachment interiorly of the vehicle beneath the dashboard thereof without decreasing the vehicle capacity or adversely affecting the appearance of the vehicle.

A still further object of this invention is to provide an evaporation-type air-cleaning and cooling unit for attachment interiorly of an automotive vehicle which is relatively simple in structure and cheap to manufacture.

The above and still further objects and advantages of the present invention will become apparent upon consideration of the following detailed description of the invention when taken in conjunction with the accompanying drawings, wherein:

Figure 1 is a front elevational view of an evaporation-type air-cleaning and cooling unit of the present invention, shown attached to an automotive vehicle beneath the dashboard thereof;

Figure 2 is a top plan view of the evaporation-type air-cleaning and cooling unit of the present invention, with parts broken away and shown in section;

Figure 3 is an enlarged fragmentary sectional view taken along the line 3—3 of Figure 2;

Figure 4 is an enlarged sectional view, with parts broken away, taken along the line 4—4 of Figure 2;

Figure 5 is an enlarged fragmentary sectional view taken along the line 5—5 of Figure 2;

Figure 6 is an enlarged fragmentary sectional view taken along the line 6—6 of Figure 1; and Figure 7 is an enlarged sectional view taken along the line 7—7 of Figure 4.

Referring now with particularity to the drawings, wherein like reference numerals have been used throughout the several views to designate like parts, there is shown an air-cleaning and cooling unit of the present invention, generally designated by the reference numeral 10, which is particularly adapted for mounting in an automotive vehicle which includes an instrument panel 11, a steering column 12 and gearshift rod 13 positioned rearwardly of the instrument panel contiguous to one end thereof, a fire wall 14 spaced forwardly of and beneath the instrument panel and separating the interior of the vehicle body from the motor compartment 15, and a pair of spaced air intake tubes 16 and 17 supported on and traversing the fire wall 14 and adapted to introduce air into the interior of the vehicle.

The air-cleaning and cooling unit 10 includes an elongated, preferably cylindrical closed-ended tank 20 which is adapted to be arranged interiorly of the vehicle longitudinally of and beneath the instrument panel 11. As clearly shown in Figure 4, the tank 20 includes a cylindrical side wall 21 and left and right hand end walls 22 and 23. The left hand end wall 22 and the adjacent end of the wall 21 are arcuately cut out, as indicated by the reference numerals 23' and 24 to accommodate the adjacent portions of the steering column 12 and the gearshift rod. The tank 20 is supported by means of a clamp 26, Figure 3, the turnbuckle 27, Figure 4, and the mounting plate 28, Figure 5. As clearly shown in Figure 3, the clamp 26 is circumposed about the steering column 26 and has one end secured to the side wall 21 of the tank 20 by means of a bolt 29, and has its other end secured to the adjacent left hand end wall 22 by means of the bolts 30. As clearly shown in Figure 4, the turnbuckle 27 is secured to depend from an adjacent portion of the instrument panel 11 and is connected to the adjacent portion of the tank. In Figure 5 there is shown the mounting plate 28 which is bolted to the fire wall 14 and to another mounting plate 31 engaging the forward side of the fire wall 14 by means of the nuts and bolts 32. Suitable gaskets, designated by the reference numerals 33 and 34 are interposed between the mounting plate 28 and the fire wall, and the forward mounting plate 31 and the fire wall.

Arranged contiguous to the ends of the tank 20 are the air inlets 35 and 36 which are connected in communication with the air intake tubes 16 and 17 at corresponding ends of the tank 20. The air inlets 35 and 36 are of like structure and include open-ended ducts 37 and 38 having one end secured to the adjacent one of the intake tubes 16 and 17, and having the other end communicating with the interior of the vehicle. Bridging the rear discharge ends of the ducts 37 and 38 are the damper plates 39 and 40 for selectively constricting the ducts 37 and 38. Intermediate the ends thereof, the ducts 37 and 38 are provided with connecting conduits 41 and 42, respectively, each of which is in communication with the adjacent one of the ducts and with the adjacent end of the tank 20. Accordingly, when the damper plates 39 and 40 are closed, the air from the intake tubes 16 and 17 is directed into the tank 20 of the unit, and when the damper plates are open the air is permitted to flow directly into the interior of the vehicle. By selectively adjusting the damper plates 39 and 40, the amount of air directed into the interior of the vehicle and directed into the cooling unit can be varied.

Contiguous to and spaced from the right hand air inlet 36, the tank is provided with an auxiliary air inlet 43 which has one end connected in communication with the interior of the tank 20 and has its other end secured to the fire wall 14 by means of the mounting plate 28, previously described, in communication with the blower 44 of the vehicle. Accordingly, when the vehicle is at a standstill or moving at a very slow rate of speed, the blower 44 can be utilized to augment the supply of air being introduced into the tank 20 by the intake tubes 16 and 17. The addition of the blower permits the cleaning and cooling unit 10 to be utilized when the vehicle is at a standstill or is moving forwardly at a slow speed.

Arranged longitudinally within the tank and rotatably supported therein is a rotor 46 which is adapted to receive a porous mass of filtering material. The rotor 46 includes a supporting shaft 47 which is arranged axially of the tank 20 and rotatably supported on the end walls 22 and 23 thereof by means of the headed studs 48 and 49 and the washers 50 and 51. Secured midway between the ends of the shaft 47 is a solid disc 52 which prevents air from the blower 44, entering the tank through the auxiliary inlet 43, from escaping through the left hand inlet 35 when the blower is being used to augment the air supply. Secured transversely of the shaft 47 at opposite sides of the disc 52 are the spiders 53 and 54 which cooperate with the disc 52 to support a foraminous spool-shaped core 55. Each of the spiders 53 and 54 includes a plurality of radially projecting arms 56 and a ring 57 secured to the outer ends of the arms 56. As clearly shown in Figure 4, the spool-shaped core 55 includes a plane cylindrical intermediate section 58, and outwardly flared end sections 59 and 60. The intermediate and end sections of the core are fabricated of suitable mesh hardware cloth which is secured about the supports 53 and 54 and additional end supports 61 and 62 spaced outwardly of the supports 53 and 54. Circumposed about the core 55 are foraminous sleeves 63 and 64 which are arranged in end-to-end, spaced relation with respect to each other. Arranged on opposite sides of the disc 52 are foraminous supporting discs 65 and 66 which are secured transversely of the core 55, and the adjacent ones of the sleeves 63 and 64. The sleeve 63, the adjacent portions of the core 55, the end support 61 and the supporting disc 65 cooperate to form an annular foraminous receptacle or container 67 for the reception of a loose porous mass of filtering material. Likewise, the sleeve 64, the adjacent portions of the core 55, the end support 62, and the supporting disc 66 cooperate to define another annular foraminous receptacle 68 for the reception of the filtering material.

A water inlet 69 entering the forward under part of the tank 20 is connected by means of suitable pipes 70 and 71 through an automatic float valve 72 to a source of water supply. Accordingly, water can be introduced into the interior of the tank and maintained at a predetermined level in accordance with the adjustment of the automatic float valve 72. As clearly illustrated in Figure 7, the automatic float valve 72 is arranged within the motor compartment 15, and is supported on the fire wall 14 contiguous to and below the air inlet tubes 16 and 17. Since the float valve 72 forms no part of the present invention and can be of any conventional structure, the valve is not described in detail.

Overlying the tank 20 and connected in communication therewith is a suitable outlet 75 which has an open mouth 76 communicating with the interior of the vehicle. As clearly illustrated, the outlet 75 is in the form of a hood 77 which has a closed forward end connected about a longitudinally extending outlet opening 78 provided in the top of the side wall of the tank 20 and has an open rear end terminating contiguous and beneath the portion of the instrument panel 11 carrying the radio.

Intermediate the ends of the open mouth 76 of the outlet 75 a plate 79 is secured to the hood and supports the pull cord 80 which may be manually manipulated by the driver of the vehicle or any occupant thereof for effecting the rotary movement of the rotor 46. As clearly illustrated in Figure 4, the intermediate portion of the pull cord 80 is trained about the spool-shaped core 55 intermediate the supporting discs 65 and 66. The pull cord 80 is arranged so that a pull on one free end thereof will effect a rotary movement of the rotor through an angle of approximately 180°, and a pull on the other free end thereof will effect a rotary movement of the rotor in the opposite direction through an angle of approximately 180°.

Suitable control vanes bridge the mouth 76 of the outlet 75 and are operable from within the vehicle for selectively directing the cooled and cleaned air to the vehicle occupants. As clearly shown in Figure 1, a pair of control vanes 82 and 83 are arranged on opposite sides of the plate 79 and are pivotally supported for movement about a horizontal axis to various inclined planes to direct the cooled and cleaned air emerging from the hood 75 upwardly or downwardly. Contiguous to the ends of the mouth 76 of the outlet 75 are supported additional control vanes 84 and 85 for directing the cooled, cleaned air from side to side. Furthermore, the side of the outlet hood is provided with an auxiliary outlet opening 86 which is provided with a control vane 87 for directing the cooled air toward the feet of the occupants of the wheels.

As clearly illustrated in Figure 4, the connecting conduits 41 and 42 are arranged to prevent the water in the tank 20 from being forced into the air ducts 37 and 38. The connecting conduits 41 and 42 are received within the end sections 59 and 60 of the spool-shaped core 55, and are shaped to fit the angle of the outwardly flared end sections.

In actual use, the air enters the tank 20 from the opposite ends thereof, passes through the wet filtering material of the core 46 and outwardly through the open mouth 76 of the outlet 75. The air being thereby cooled and cleaned of dust, the vehicle occupants are enabled to drive with the windows closed, thereby eliminating the discomfort of windburn which occurs when driving in extremely hot weather, and eliminating the noise incident to driving at a speed where normal conversation or the vehicle radio cannot be heard. The arrangement of the device within the vehicle does not decrease the vehicle space or adversely affect the appearance of the vehicle. It has been found that cooling and cleaning systems which are arranged exteriorly of the vehicle cause an unsightly bulk which ruins the appearance of the vehicle, and at the same time creates a wind drag, causing the vehicle to use additional fuel. The disposition of the unit beneath the dashboard permits the cool air to be directed to any and all of the occupants of the vehicle.

Althought only one embodiment of the cooling and cleaning unit of the present invention has been described, it is readily apparent that numerous modifications can be made without departing from the spirit of the invention as set forth in the appended claims.

What I claim is:

1. In an air cleaning and cooling unit for a motor vehicle, air intake tubes arranged in spaced relation, a cylindrical tank positioned between said tubes, said tank having closed ends, and containing fluid, a hollow cylindrical liquid-absorbing core arranged concentrically within said tank, said core having open ends, air inlet conduits connected at one end to said air intake tubes at points intermediate the ends of said air intake tubes, said air inlet conduits having other ends extending into the open ends of said core and opening therein, and a discharge hood overlying said tank and connected thereto, said hood communicating with the interior of the tank through an opening formed in the side wall of the tank and having a cooled and cleaned air-discharging mouth.

2. In an air cleaning and cooling unit for a motor vehicle, air intake tubes arranged in spaced relation, a cylindrical tank positioned between said tubes, said tank having closed ends, and containing fluid, a hollow cylindrical liquid-absorbing core arranged concentrically within said tank, said core having open ends, air inlet conduits connected at one end to said air intake tubes at points intermediate the ends of said air intake tubes, said air inlet conduits having other ends extending into the open ends of said core and opening therein, a discharge hood overlying said tank and connected thereto, said hood communicating with the interior of the tank through an opening formed in the side wall of the tank and having a cooled and cleaned air discharging mouth, said air intake tubes having open discharge ends facing in the same direction as said discharge mouth, and valves for selectively closing and opening the discharge mouth and the discharge ends of the air intake tubes.

3. In an air cleaning and cooling unit for motor vehicles having laterally spaced air intake tubes having intake ends and discharge ends, a fluid-containing tank adapted to be mounted between the air intake tubes, said tank having closed ends, a hollow cylindrical absorbent core positioned lengthwise within the tank and having open ends, air inlet conduits traversing the closed ends of the tank, said air inlet conduits having open ends positioned in the open ends of said core, said air inlet conduits having other ends connected in communication with said air intake tubes at points intermediate the intake and discharge ends of said air intake tubes, valves on the discharge ends of the air intake tubes, said valves being arranged to be closed to divert all of the air taken in by the air intake tubes into the core in the cylinder and to be opened to permit some of the air taken in by the air intake tubes to pass from the discharge ends of the air intake tubes, and a cleaned and cooled air discharge hood on said tank between its ends and communicating with the upper part of the interior of the tank, said hood having a discharge mouth extending away from a side of the tank.

CHARLES FREDERICK RICHTER, Sr.

References Cited in the file of this patent

UNITED STATES PATENTS

| Number | Name | Date |
|---|---|---|
| 2,074,265 | Kirby | Mar. 16, 1937 |
| 2,230,020 | Webster | Jan. 28, 1941 |
| 2,364,249 | Steele | Dec. 5, 1944 |
| 2,432,755 | Hanson | Dec. 16, 1947 |